(No Model.)

W. H. JOHNSTON.
CABLE TERMINAL BOX.

No. 571,594. Patented Nov. 17, 1896.

Witnesses:
D. H. C. Sanner
John H. Sinclair.

Inventor:
Willbur H. Johnston,
By Barton & Brown
Attorneys.

UNITED STATES PATENT OFFICE.

WILLBUR H. JOHNSTON, OF ST. LOUIS, MISSOURI, ASSIGNOR TO THE BELL TELEPHONE COMPANY OF MISSOURI, OF SAME PLACE.

CABLE TERMINAL-BOX.

SPECIFICATION forming part of Letters Patent No. 571,594, dated November 17, 1896.

Application filed September 14, 1896. Serial No. 605,710. (No model.)

*To all whom it may concern:*

Be it known that I, WILLBUR H. JOHNSTON, a citizen of the United States, residing at St. Louis, in the State of Missouri, have invented a certain new and useful Improvement in Cable Terminal-Boxes, (Case No. 2,) of which the following is a full, clear, concise, and exact description, reference being had to the accompanying drawings, forming a part of this specification.

My invention relates to cable terminal-boxes; and its object is to arrange the cable-heads in such a manner that the conductors of one cable may be brought directly and without intermediate wiring into connection with another cable, each cable being protected by a distinct cable-head. The conductors of one cable are connected by fuses or other suitable protecting devices with the conductors of the other cable.

The cable terminal-box is preferably provided with two distinct cable-heads, in the larger of which the main cable is adapted to be contained, the smaller head being provided for the reception of a branch cable, whose conductor it is desired to connect with those of the main cable. I preferably term this branch cable the "office-cable." Such a cable consists of a group of conductors from the street or other mains which it is desired to lead into a central office, as in telephone-work, the connection with the main cable being made through fuses or other protecting devices.

It is evident that a terminal-box may be employed having a plurality of main cable-heads and auxiliary cable-heads; but, for the sake of clearness, I have shown and described the terminal-box containing one main and one auxiliary or branch cable-head.

I have illustrated in the accompanying drawings two cables arranged in cable-heads and connected in accordance with my invention.

Figure 1:
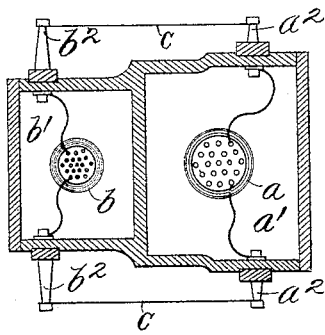
Figure 2:
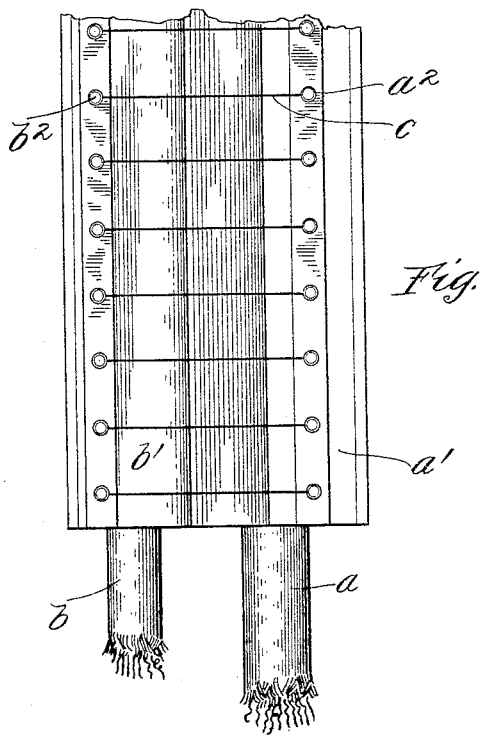

Figure 1 is a cross-section of the cable terminal-box, and Fig. 2 a partial elevation thereof.

Like letters refer to like parts in both figures.

The cable $a$ from the street-mains is led into the main cable-head $a'$, and a second or office cable $b$ is led into the auxiliary cable-head $b'$. Binding-posts or terminals $a^2 a^2$ are provided upon the cable-head $a'$, to which the conductors of cable $a'$ are secured, fuses $c$ extending from said binding-posts $a^2$ to similar binding-posts $b^2$, mounted upon the auxiliary cable-head $b$, to which the conductors of cable $b$ are secured.

It will be seen that while each cable is protected by a separate cable-head its conductors are directly connected with those of the other cable through the fuses, thus entirely obviating the necessity of separate exposed wiring and special frames for the reception of the arresters or fuses, which have been necessary heretofore.

The cable terminal-box of my invention is extremely simple, compact, and its connections not easily disarranged.

Having thus described my invention, what I claim as new, and desire to secure by Letters Patent, is—

1. In a cable terminal-box the combination with a main cable-head and an auxiliary cable-head forming the box, said main and auxiliary cable-heads being adapted to contain the main and office cables respectively, of binding-screws or terminals located upon each cable-head, to which the conductors of the respective cables are adapted to be connected, and external conductors adapted to electrically connect the terminals connected with the conductors of one cable with the terminals connected with the conductors of the other cable, substantially as described.

2. The combination with a main cable-head adapted to receive a main cable, of an auxiliary cable-head adapted to receive a branch or office cable, said cable-heads forming a cable terminal-box, binding-screws or terminals mounted upon each cable-head, to which terminals the conductors of the respective cables are adapted to be connected, and fuses or other heavy current-arresters adapted to electrically connect the terminals connected with the conductors of one cable with the terminals connected with the conductors of the other cable, substantially as described.

In witness whereof I hereunto subscribe my name this 10th day of September, A. D. 1896.

WILLBUR H. JOHNSTON.

Witnesses:
W. S. MORRIS,
S. E. STEARNS.